United States Patent [19]
Isobe et al.

[11] Patent Number: 5,507,262
[45] Date of Patent: Apr. 16, 1996

[54] CONTROL APPARATUS FOR INTERNAL COMBUSTION ENGINE WITH EXHAUST GAS RECIRCULATON

[75] Inventors: Daiji Isobe, Toyohashi; Kiyoji Tara, Chiryu, both of Japan

[73] Assignee: Nippondenso Co., Ltd., Kariya, Japan

[21] Appl. No.: 457,970

[22] Filed: Jun. 5, 1995

[30] Foreign Application Priority Data

Jun. 29, 1994 [JP] Japan ................... 6-148138

[51] Int. Cl.⁶ ................ F02D 41/16; F02M 25/07
[52] U.S. Cl. .................... 123/339.23; 123/571
[58] Field of Search ............... 123/339.14, 339.19, 123/339.23, 339.28, 568, 569, 571

[56] References Cited

U.S. PATENT DOCUMENTS

| | | | |
|---|---|---|---|
| 4,210,112 | 7/1980 | Nakamura et al. | 123/571 |
| 4,281,631 | 8/1981 | Yamaguchi | 123/571 |
| 4,300,516 | 11/1981 | Hayakawa | 123/571 |
| 4,313,415 | 2/1982 | Shinzawa | 123/571 |
| 4,373,487 | 2/1983 | Hamren | 123/571 |
| 4,397,289 | 8/1983 | Haka et al. | 123/571 |
| 4,691,675 | 9/1987 | Iwaki | 123/339.23 |
| 4,750,466 | 6/1988 | Hibino et al. | 123/571 |
| 5,325,828 | 7/1994 | Yamaguchi et al. | 123/571 |
| 5,343,840 | 9/1994 | Wataya et al. | 123/339.23 |

FOREIGN PATENT DOCUMENTS

| | | |
|---|---|---|
| 54-176025 | 5/1953 | Japan . |
| 1104943 | 4/1989 | Japan . |
| 3246362 | 11/1991 | Japan . |

*Primary Examiner*—Willis R. Wolfe
*Attorney, Agent, or Firm*—Cushman Darby & Cushman

[57] ABSTRACT

In a mechanical type EGR apparatus, an EGR valve receives a negative pressure near a throttle valve and opens/closes an EGR path in response to the negative pressure. An EGR-VM is operated in response to an exhaust gas pressure to control a diaphragm back pressure to be introduced into the EGR valve. A CPU calculates a control amount of an ISC valve in order to obtain an optimum EGR ratio characteristic, depending upon engine operation conditions, and drives the ISC valve based on this control amount. The negative pressure at the negative pressure around the throttle valve is changed when the ISC valve is opened/closed and thus a portion of air into the engine flows through a bypass path, so that the diaphragm back pressure into the EGR valve is controlled to a desired value.

7 Claims, 11 Drawing Sheets

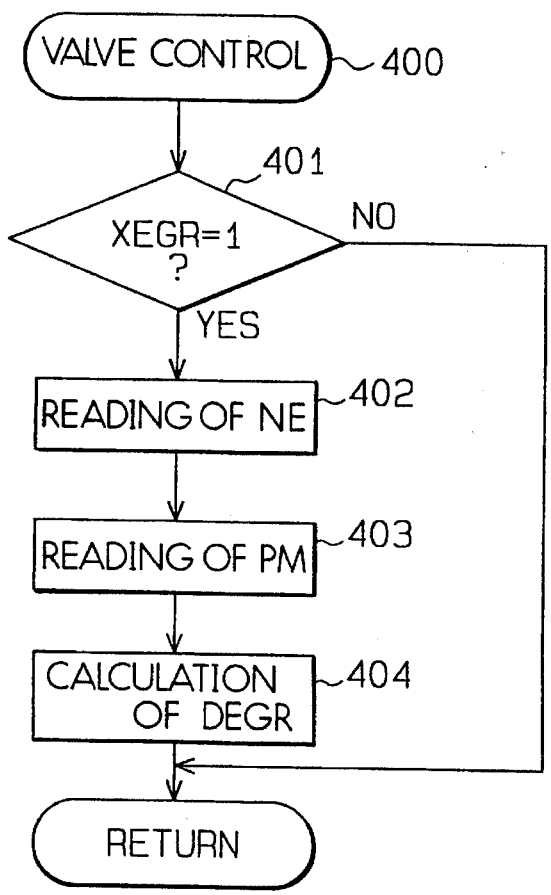
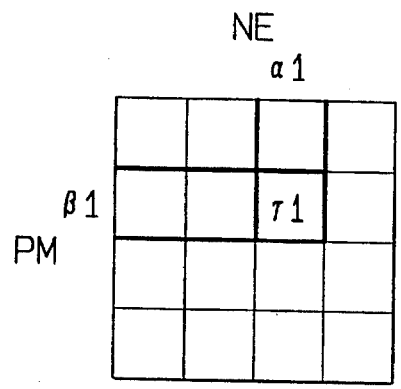
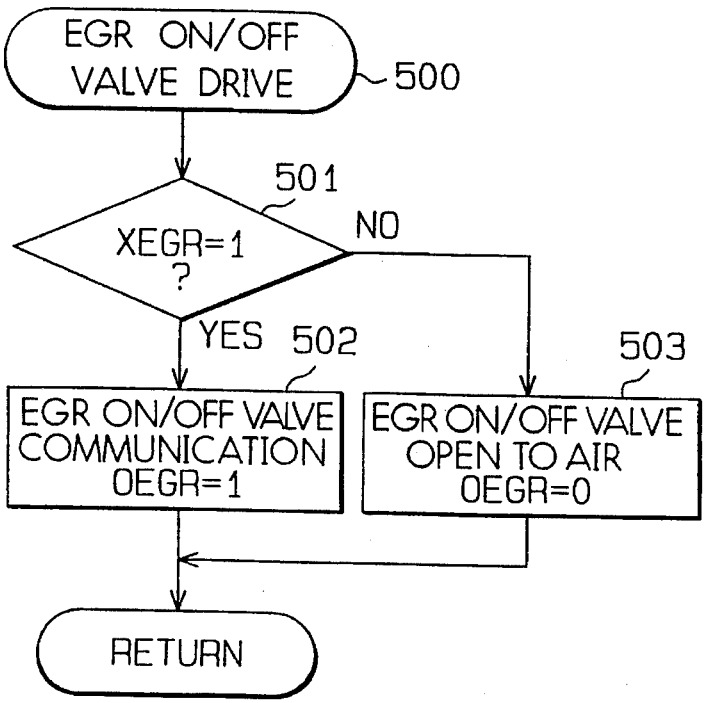

CONTROL APPARATUS FOR INTERNAL COMBUSTION ENGINE WITH EXHAUST GAS RECIRCULATON

BACKGROUND OF THE INVENTION

1. Field of the Invention

The present invention relates to a control apparatus for an internal combustion engine. More specifically, the present invention is concerned with a control apparatus for an automotive engine equipped with an exhaust gas circulation apparatus (EGR apparatus) for recirculating an exhaust gas from an engine exhaust system to an engine air intake system.

2. Description of Related Art

Conventionally, various control apparatuses equipped with EGR recirculation for recirculating the exhaust gas from an engine exhaust system to an engine air intake system have been proposed. It should be noted that as this EGR apparatus, there is a so-called "mechanical type EGR apparatus" for controlling the exhaust gas recirculation amount (EGR amount) of the exhaust gas responsively to the negative pressure in the air intake system and the exhaust gas pressure into the EGR valve (exhaust gas recirculation control valve) and the EGR-VM (negative pressure control valve). Also, there are other control apparatuses, i.e., a so-called "electronic control type EGR apparatus" for controlling the EGR amount by the use of an electromagnetically-operated actuator. In general, the former mechanical type EGR apparatus has been well utilized because of the low cost and the high reliability. In other words, in the mechanical EGR apparatus, there is no such a risk that the electric signal line is disconnected, the sensors erroneously sense the operating conditions, and the actuator is erroneously operated due to thermal influences.

The arrangement of the typical mechanical type EGR apparatus will now be summarized. That is, the air intake negative pressure appearing near a throttle valve is introduced into the EGR valve, and this EGR valve opens and closes the EGR path in response to this negative pressure. Both the air intake negative pressure and the exhaust gas pressure are introduced into the EGR-VM. The EGR-VM controls the air intake negative pressure to the EGR valve in accordance with the balance between the air intake negative pressure and the air exhaust pressure. Such EGR apparatus, for instance, has an EGR characteristic shown by a broken line (characteristic curve "La") in FIG. 17. FIG. 17 graphically represents the characteristic of the EGR ratio (EGR amount/air intake amount) with respect to the air intake negative pressure under a preselected engine revolution speed.

However, when the EGR control is carried out by the conventional mechanical type EGR apparatus, there occur the following problems.

That is, since the EGR amount is determined based on the balance in the air intake negative pressure and the exhaust gas pressure in accordance with the above-described conventional mechanical type EGR control, this EGR characteristic cannot be precisely controlled in accordance with the engine operation conditions. As a result, this EGR characteristic results in a low degree of freedom with respect to the optimum characteristic. Since the safety allowance is sufficiently required, this EGR characteristic should be set with having compromise.

As a consequence, when the improvements in the exhaust emission and also fuel efficiency are required due to the specification requirements of the internal combustion engine, such a requirement could not be sufficiently achieved by the conventional mechanical type EGR control. For example, when the emission improvement is required, this characteristic becomes the characteristic curve "Lb" shown by the solid line in FIG. 17, but this requirement could not be satisfied by the conventional EGR control. Also, in such a low load region where combustion becomes unstable, since the air intake negative pressure is high and also the air intake amount is low, accuracy in the EGR control is considerably deteriorated. Thus, this may give adverse influences on the vehicle driveability and the engine knocking characteristic.

SUMMARY OF THE INVENTION

The present invention has been made to solve the above-described problems, and therefore, has an object to provide a control apparatus for an internal combustion engine such that in the mechanical type exhaust gas recirculating apparatus for controlling the exhaust gas recirculation in response to the intake negative pressure and the exhaust pressure, an EGR amount is controlled in high accuracy to obtain a desirable optimum EGR characteristic.

According to the present invention, when the intake negative pressure is introduced into an exhaust gas recirculation control valve from a negative pressure conducting port near a throttle valve, the exhaust gas recirculation control valve opens/closes a recirculation path in response to this negative pressure. At this time, in response to the exhaust gas pressure taken from the gas exhaust system, the negative pressure from the negative pressure conducting port to the exhaust gas recirculation control valve is controlled. In conjunction with this open/close operation of the exhaust gas recirculcation control valve, a portion of the exhaust gas of an internal combustion engine is recirculated into the air intake path. Thus, the recirculation amount of the exhaust gas is mechanically controlled by operating the exhaust gas recirculation control valve and the negative pressure control valve.

In the idle operation range of the internal combustion engine, first control means releases the negative pressure path in the atmospheric air by a three-way valve, and also drives the idle revolution speed control valve so as to control the idle speed to a desired value. Further, second control means drives the idle speed control valve so as to control the negative pressure at the negative pressure conducting port, and communicates the negative pressure path by the three-way valve in the exhaust gas recirculation operation range different from the idle operation range.

Thus, a portion of air sucked into the engine flows through the bypass path by opening/closing the idle revolution speed control valve, so that the negative pressure conducting port is varied. In this case, when the idle speed control valve is operated to the open side, the negative pressure at the negative pressure conducting port is reduced. When the idle speed control valve is operated to the close side, the negative pressure at the negative pressure conducting port is increased. Thus, the negative pressure at the exhaust gas recirculation control valve can be arbitrarily controlled, so that the exhaust gas recirculation control can be realized in high accuracy.

Also, since the exhaust gas circulation amount is controlled by the use of the idle speed control valve which is normally used to perform the idle revolution speed control, the exhaust gas recirculation control may be readily employed in the existing control apparatuses.

Preferably, a target recirculation amount of the exhaust gas is preset with respect to various engine operation conditions. Second control means calculates such a correction amount used to reduce a deviation amount between the target recirculation amount and an actual exhaust gas recirculation amount of the exhaust gas recirculation control valve, depending on the negative pressure controlled by the negative pressure control valve. It further drives an idle revolution speed control valve based upon the calculated correction amount.

More preferably, open degree detecting means detects an open degree of the exhaust gas recirculation control valve. The second control means drives the idle speed control valve so as to reduce a deviation amount between a preset target open degree and the open degree of the exhaust gas circulation control valve detected by the open degree detecting means.

BRIEF DESCRIPTION OF THE DRAWINGS

In the accompanying drawings:

FIG. 8 is a flow chart showing a valve control amount calculating routine in the first embodiment;

FIG. 9 is a map used to determine an open degree instruction value in the first embodiment;

FIG. 10 is a flow chart showing an EGR valve drive routine in the first embodiment;

DETAILED DESCRIPTION OF THE PREFERRED EMBODIMENTS

The present invention will be described in detail with reference to presently preferred embodiments illustrated in the accompanying drawings.

(First Embodiment)

A description will now be made of a control apparatus for an internal combustion engine with an exhaust gas recirculation according to the first embodiment.

Figure 1:
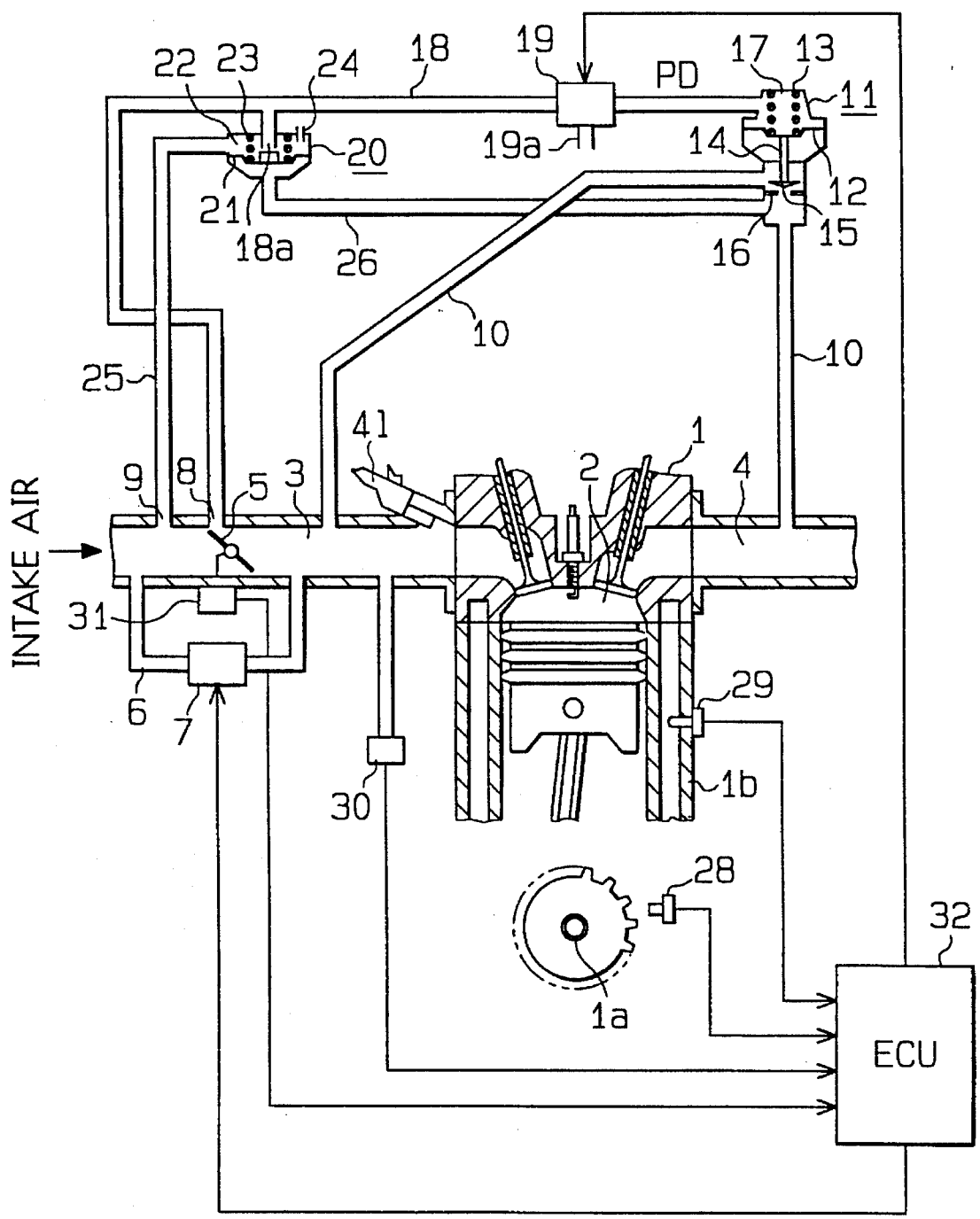
FIG. 1 is a schematic view showing the arrangement of an exhaust gas recirculation control apparatus for an internal combustion engine according to the present invention.

FIG. 1 schematically illustrates a structure of the control apparatus. In FIG. 1, both an air intake path 3 and an exhaust path 4, which communicate with a combustion chamber 2, are connected to an engine body 1, and a throttle valve 5 which is open/closed in conjunction with operations of an accelerator (not shown) is provided in the air intake path 3. Also, a bypass path 6 is formed in the air intake path 3, which bypasses the throttle valve 5 to communicate with an upstream side and a downstream side of the throttle valve 5. In this bypass path 6, an idle rotation speed control valve (ISC valve) 7 driven by a stepper motor is disposed. The open degree of this ISC valve 7 is adjusted so as to control the engine speed (revolution number) during the idle drive to a desired engine idle speed.

On the other hand, in this control apparatus, a mechanical type EGR apparatus is provided which controls a recirculation amount (EGR amount) of an exhaust gas in response to negative pressure introduced from an area near the throttle valve 5 and exhaust gas pressure. An arrangement of this mechanical type EGR apparatus will now be described in detail. It should be noted that "negative pressure" as mentioned in this specification corresponds to gauge pressure indicative of a pressure difference between the negative pressure and atmospheric pressure used as the basic pressure. The high the negative pressure becomes, the more the vacuum condition is achieved.

To the air intake path 3, there are provided a first negative pressure (vacuum) port (vacuum conducting port) 8 which is positioned at an upstream side when the throttle valve 5 is fully closed, and is positioned at a downstream side when this throttle valve 5 is open over a predetermined open degree, and a second negative pressure port (vacuum conducting port) 9 located at an upstream side from the first negative pressure port 8. These negative pressure ports 8 and 9 are positioned between an opening at the upstream side of the bypass path 6 and another opening at the downstream side of the same.

One end of the EGR path 10 is connected to the exhaust path 4 and the other end of this EGR path 10 is connected to the downstream side of the throttle valve 5 of the air intake path 3. At a midway of the EGR path 10, an EGR valve 11 functioning as an exhaust gas recirculation controlling valve is provided. In the EGR valve 11, a valve body 15 is fixed via a rod 14 to a lower surface of a diaphragm 12, and this valve body 15 is located opposite to a seat surface 16. A back pressure chamber 17 communicated via a first negative pressure path 18 to the first negative pressure port 8 is provided on the upper surface of the diaphragm 12. The negative pressure (diaphragm back pressure PD) introduced through the first negative pressure path 18 is effected to this negative pressure chamber 17. A compression coil spring 13 is arranged in the back pressure chamber 17, and the diaphragm 12 is always biased by this compression coil spring 13 in the lower direction as viewed in FIG. 1 (namely, a direction in which the valve body 15 abuts against the seat surface 16 ).

As a result, when the diaphragm back pressure PD becomes greater than the biasing force of the compression spring 13, the diaphragm 12 is displaced in the upper direction as viewed in FIG. 1 against the biasing force of the compression coil spring 13. At this time, a tip portion of the valve body 15 is separated from the seat portion 16, so that a portion of the exhaust gas passing through the exhaust path 4 is recirculated via the EGR path 10 into the air intake path 3.

Also, at the midway of the first negative pressure path 18, an EGR ON/OFF valve 19 functioning as an ON/OFF type 3-way valve is provided. When the EGR ON/OFF valve 19 is under "communication" condition, the diaphragm back pressure PD corresponding to the negative pressure from the first negative pressure path 18 is effected to the EGR valve 11. At this time, in response to the diaphragm back pressure PD, the EGR valve 11 is operated to perform the EGR function. When the EGR ON/OFF valve 19 is under "open air" condition, the atmospheric pressure given from an atmospheric air path 19a is effected to the diagram back pressure PD of the EGR valve 11, so that no EGR function is performed.

On the other hand, at a halfway of the first negative pressure path 18, there is provided an EGR vacuum modulator (EGR-VM) 20 functioning as a negative pressure control valve for controlling the diaphragm back pressure PD in response to the pressure in the exhaust gas introduced from the exhaust path 4. In the EGR-VM 20, both of the first negative pressure path 18 and the second negative pressure path 25 are connected to a negative pressure chamber 22, and further an atmospheric air releasing hole 24 is provided so as to conduct atmospheric air into this negative pressure chamber 22. A compression coil spring 23 is arranged within the negative pressure chamber 22. Then, compression coil spring 23 exerts a force to a space defined between an opening 18a and the upper surface of the diaphragm 21 in a direction along which this space is expanded (lower direction as viewed in FIG. 1). This opening 18a is branched from the first negative pressure path 18 and opened to the negative pressure chamber 22. the larger this space is expanded, the more atmospheric air is taken from the atmospheric air opening hole 24 into the first negative pressure path 18. Furthermore, exhaust gas pressure is introduced via the exhaust path 26 to the lower surface of the diaphragm 21.

As a consequence, in the above-described EGR-VM20, either the negative pressure from the first and second negative ports 8 and 9 into the negative pressure chamber 22 is increased, or the exhaust gas pressure is increased, the diaphragm 21 is pushed up along the upper direction as viewed in FIG. 1. At this time, an amount of atmospheric air taken from the atmospheric air opening hole 24 is reduced, so that the negative pressure within the first negative pressure path 18, namely the diaphragm negative pressure PD of the EGR valve 11 becomes high.

Figure 3:
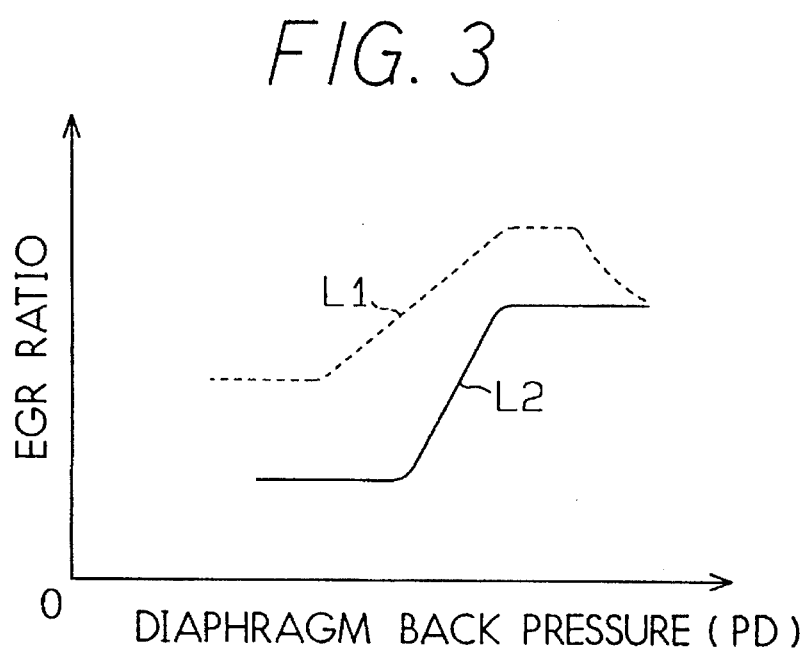
FIG. 3 is a graph for showing the EGR characteristic with respect to the negative pressure.

FIG. 3 graphically represents the relationship of an EGR rate to the diaphragm back pressure PD (=EGR amount/air intake amount) under a predetermined engine speed (for instance, 1200 rpm). The above-described mechanical type EGR apparatus has an EGR characteristic L1 indicated by a broken line in FIG. 3. It should be noted that the characteristic L1 indicates such a characteristic when the open degree of the ISC valve 7 becomes "0" during the EGR control, and is determined based on the diaphragm characteristics of the EGR valve 11 and the EGR-VM20, and also the coil spring characteristic.

In FIG. 1, on the other hand, as a sensor group for sensing engine operation conditions, a revolution angle sensor 28 for outputting a signal in synchronism with the revolution of the engine is provided on a crank shaft 1a, and a cooling water sensor 29 for sensing temperatures of the cooling water in the engine is provided on a cylinder block 1b. Also, an air intake pressure sensor 30 for sensing air intake pressure of the engine is provided in the air intake path 3, and a throttle open degree sensor 31 for sensing the open degree of the throttle valve 5 is provided on the throttle valve 5. The above-explained various sensors 28 to 31 are connected to an electronic control apparatus (ECU) 32. The ECU 32 controls to drive the ISC valve 7 and the EGR ON/OFF valve 19 in response to the sensor signals derived from the sensors 28 to 31. The ECU 32 further controls a fuel injector 40 in the known manner.

Figure 2:
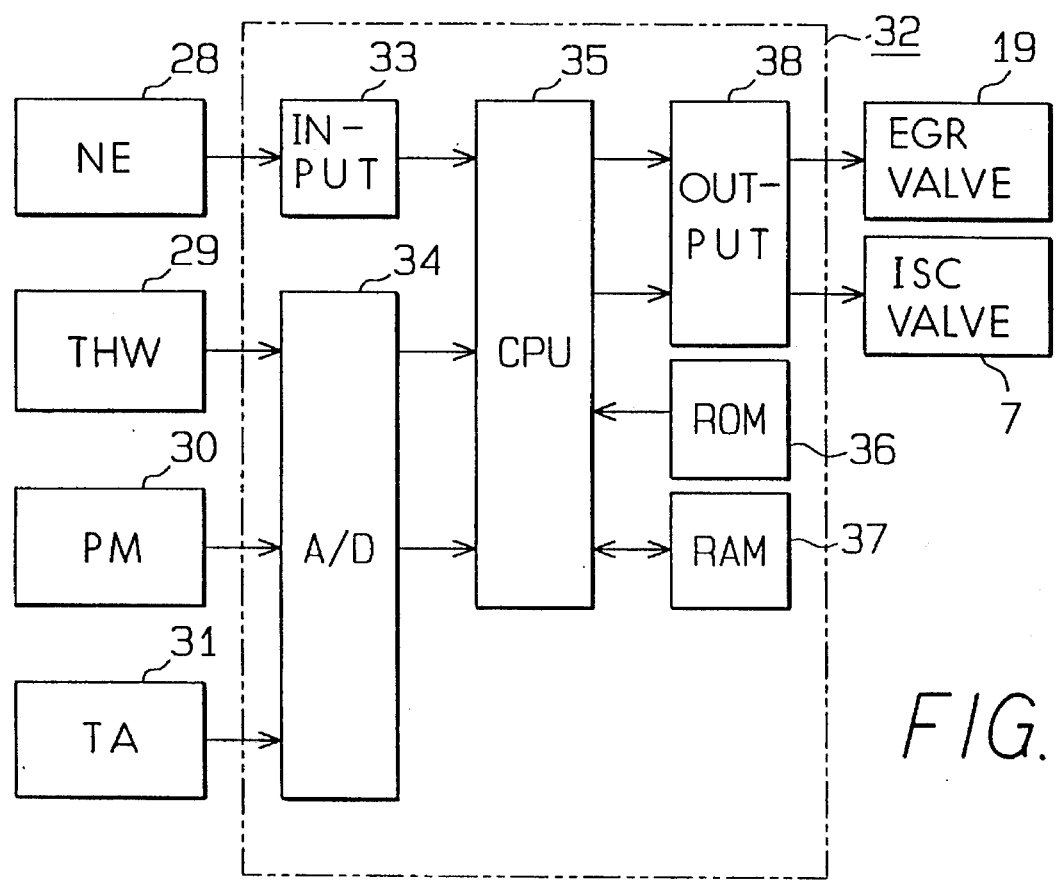
FIG. 2 is a block diagram showing the electronic circuit arrangement of ECU.

FIG. 2 schematically represents an electronic arrangement of the ECU 32. In FIG. 2, the ECU 32 includes an input circuit 33, an A/D converter 34, a CPU (central processing unit) 35, a ROM (read-only memory) 36, a RAM (random access memory) 37, and an output circuit 38. The CPU 35 calculates the revolution speed NE of the engine in response to the sensor signal of the revolution angle sensor 28 entered via the input circuit 33, and also calculates the cooling water temperature THW, the air intake pressure PM, and the throttle open degree TA in response to the respective sensor signals from the cooling water temperature sensor 29, the air intake pressure sensor 30, and the throttle open sensor 31, which are entered via the A/D converter 34.

Further, the CPU 35 produces a drive instruction value OEGR for maintaining the EGR ON/OFF valve 19 under either the "communicating" condition, or the "atmospheric air opening" condition, and then outputs this drive instructionvalue OEGR via the output circuit 38 to the EGR ON/OFF valve 19. In addition, the CPU 35 produces an open-degree instruction value DEGR used to control the open degree of the ISC valve 7 by driving the stepper motor of the ISC valve 7, and then outputs this open-degree instruction value DEGR via the output circuit 38 to the ISC valve 7.

Next, a detailed description will now be made of operations of the control apparatus with the above-described arrangement.

First, a control process by the control apparatus will now be explained. In other words, in this control apparatus, an amount of auxiliary air flowing through the bypass path 6 is controlled by employing the ISC valve 7 during the engine idle operation (closed throttle condition), and such an idle revolution speed feedback control is carried out in order that the idle revolution speed is set to be equal to a desired target revolution speed in the known manner. Secondary, an amount of auxiliary air flowing through the bypass path 6 is controlled by using the ISC valve 7 during the warming-up operation such as the engine starting operation, and then an engine revolution speed open-loop control is carried out in order that the engine revolution speed is set to a control value in response to the cooling water temperature.

Thirdly, the negative pressure taken from the first and second negative pressure ports 8 and 9 into the EGR valve 11 is similarly controlled by employing the ISC valve 7 during the EGR control operation, and then the EGR characteristic determined by the above-explained mechanical type EGR apparatus (shown in FIG. 1) is so controlled as to become an optimum EGR characteristic in accordance with the specification of the internal combustion engine. It should be noted that the above-described first to third controls may be switched in accordance with the determination result based on the EGR control condition and the idle revolution speed control condition.

Here, the optimum EGR characteristic corresponding to the specification requirement of the internal combustion engine is indicated by a solid line (characteristic line L2) in FIG. 3. That is, the characteristic line L2 has been obtained by carrying out the experiment for the optimum EGR characteristic so as to improve the exhaust emission. With respect to the above-explained mechanical type EGR characteristic (characteristic line L1), such improvements as to the exhaust emission can be achieved that for instance, the EGR ratio (rate) is lowered in the large HC area, thereby reducing the HC. In other words, according to this control, the EGR ratio is corrected so as to reduce the deviation amount between the EGR ratio of the characteristic line L1 by the mechanical type EGR control and the optimum EGR ratio (target circulation amount) of the characteristic line L2. This deviation correction is realized by correcting the diaphragm back pressure PD caused by driving the ISC valve 7. It should be noted that since the open degree of the ISC valve 7 is set to "0" in the characteristic line L1, the ISC valve 7 is driven to the opening side during the EGR control. At this time, the diaphragm back pressure PD is reduced and the EGR ratio is lowered. As a result, the characteristic line L1 is set to be higher than the characteristic line L2 in order to obtain the characteristic line L2 by driving the ISC valve 7.

Referring now to various routines executed by the CPU 35, the above-described control will be described more in detail.

Figure 4:
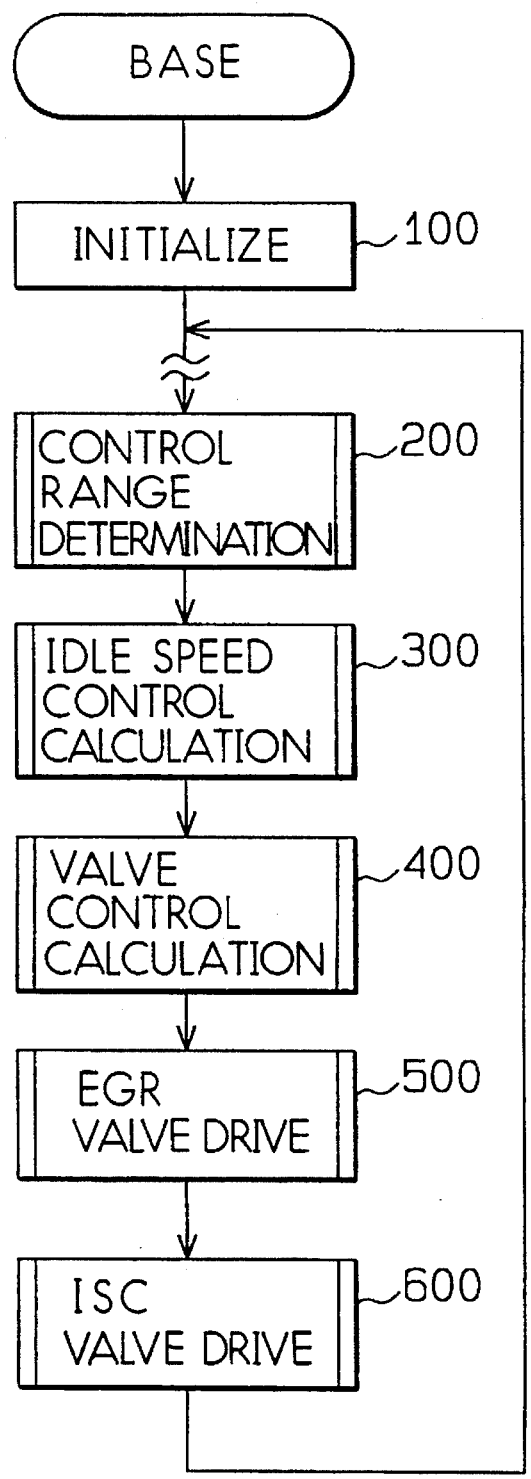
FIG. 4 is a flow chart showing a base routine in the first embodiment.

FIG. 4 is a flow chart of a base routine executed by the CPU 35. The routine of FIG. 4 is initiated by turning on the power source. After the various sorts of memories are initialized by the CPU 35 at a step 100, various sorts of subroutines defined by steps 200 to 600 are executed in conjunction of the various process periods.

That is, in the control range determination routine at a step 200, the CPU 35 determines whether or not the engine operation condition is within the allowable region of the EGR control, and further determines whether or not this engine operation condition is within the allowable region of the idle revolution speed control. In an idle revolution speed controlling amount calculation routine at a step 300, the CPU 35 calculates a control amount (feedback control value DGB, or open-loop control value DOP) of the ISC valve 7 in order to control that the idle revolution speed is set to a desired engine revolution speed. In a valve controlling amount calculation routine at a step 400, the CPU 35 calculates a control amount (open-degree instruction value DEGR) of the ISC valve 7 so as to control that the EGR ratio is set to the optimum EGR ratio.

Moreover, in an EGR ON/OFF valve drive routine at a step 500, the CPU 35 drives the EGR ON/OFF valve 19 to either the "communicating" condition, or the "atmospheric air opening" condition. Also, in an ISC valve drive routine at a step 600, the CPU 35 drives the ISC valve 7 at a preselected open degree in response to the control amount of the ISC valve 7 calculated at the previous step 300 or 400. It should be noted that the routines defined at the steps 200, 300 and 400 are executed in a time period of 30 ms, and the routine defined at the step 500 is carried out in a time period of 60 ms, and also the routine defined at the step 600 is performed in a time period of 4 ms, respectively.

The process of the respective subroutines performed in the above-described steps 200 to 600 will now be described in detail.

Figure 5:
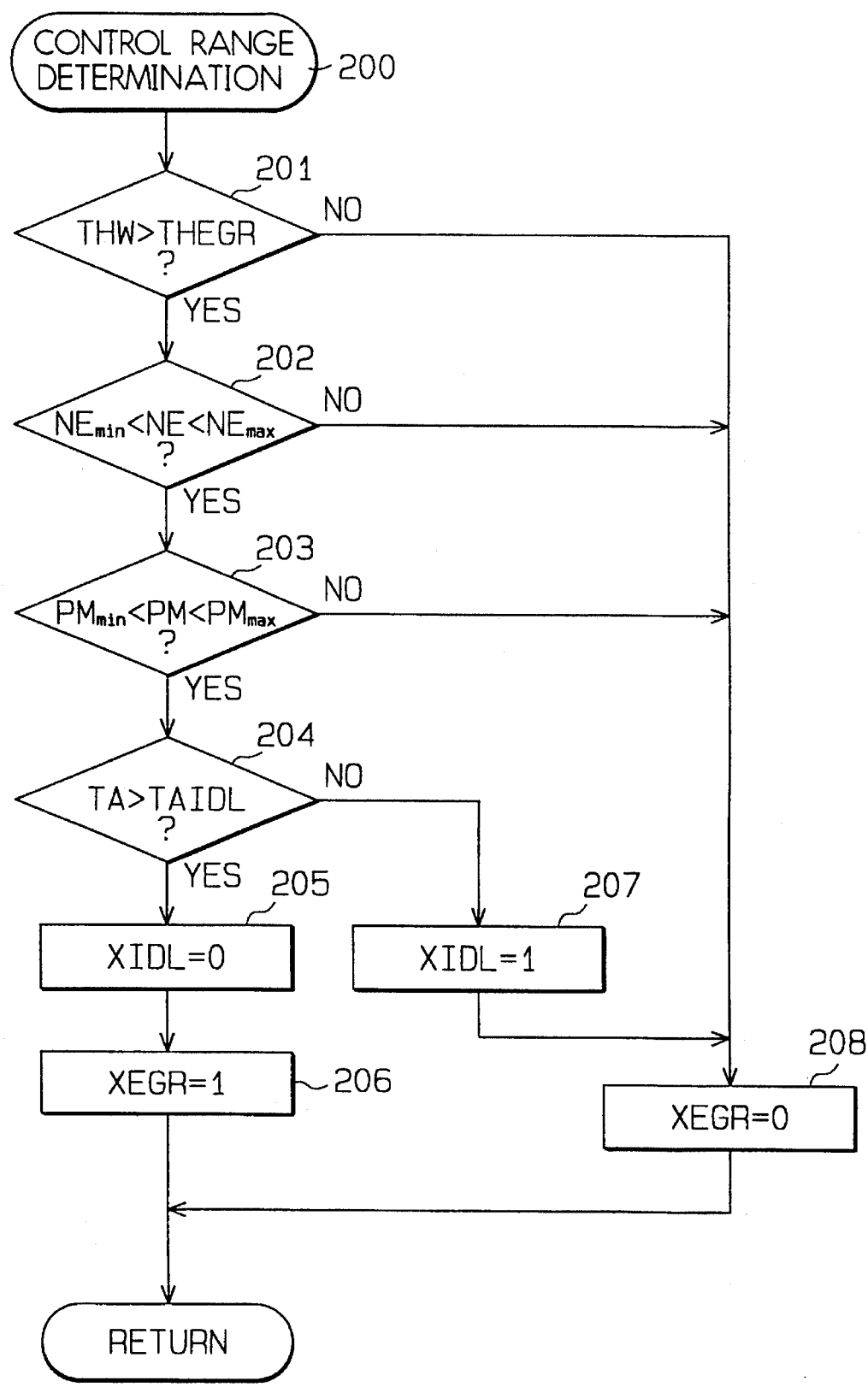
FIG. 5 is a flow chart showing a control range determination routine in the first embodiment.

A flow chart of FIG. 5 shows the control range determination routine (step 200 of FIG. 4). In FIG. 5, the CPU 35 determines whether or not each of the cooling water temperature THW, the engine revolution speed NE, and the air intake pressure PM is present within the EGR control ON/OFF region. More specifically, the CPU 35 makes a determination as to whether or not the cooling water temperature THW exceeds an EGR ON water temperature THEGR (THEGR=50° C. in this embodiment) at a step 201.

Also, the CPU 35 determines whether or not the engine revolution speed NE is present within a range between the minimum EGR ON revolution speed NEmin (NEmin=100 rpm in this embodiment) and the maximum EGR ON revolution speed NEmax (NEmax=5000 rpm in this embodiment) at a step 202. Furthermore, the CPU 35 determines whether or not the air intake pressure PM is within a range between the minimum EGR ON/OFF pressure PMmin (PMmin=−500 mmHg in this embodiment) and the maximum EGR ON pressure PMmax (PMmax=−100 mmHg in this embodiment).

Then, when any one of these steps 201 to 203 could not be satisfied, the CPU 35 advances its process operation to a step 208 at which the CPU 35 clears an EGR ON flag XEGR to be "0", this routine is ended. It should be noted that the EGR ON flag corresponds to such a flag indicative of "ON" or "OFF". The flag XEGR=0 indicates "OFF", whereas the flag XEGR=1 denotes "ON".

When all of the determinations defined at the step 201 to 203 are made "YES", the CPU 35 advances its process operation to a step 204 at which the CPU 35 determines whether or not the engine is under non-idle state, or under idle state by checking as to whether or not the throttle open degree TA exceeds the idle open degree TAIDL (TAIDL=3°) in this embodiment. In this case, if TA>TAIDL, then the CPU 35 recognizes that the engine state is under non-idle state. Then, an idle determination flag XIDL is cleared to "0" at a step 205, and the EGR ON flag XEGR is set to "1" at the subsequent step 206. It should be understood that the idle determination flag XIDL is such a flag indicative of an "idle" state, or a "non-idle" state, and the idle flag XIDL=0 indicates "non-idle" state where no idle speed feedback control is carried out, and the idle flag XIDL=1 represents the idle state where idle speed feedback control is carried out.

If TA>AIDL at the previous step 204, then the CPU 35 recognizes that it is under idle state. At a step 207, the idle determination flag XIDL is set to "1". At the subsequent step 208, the EGR ON flag XEGR is cleared to "0", so that the EGR control is prohibited.

Figure 6:
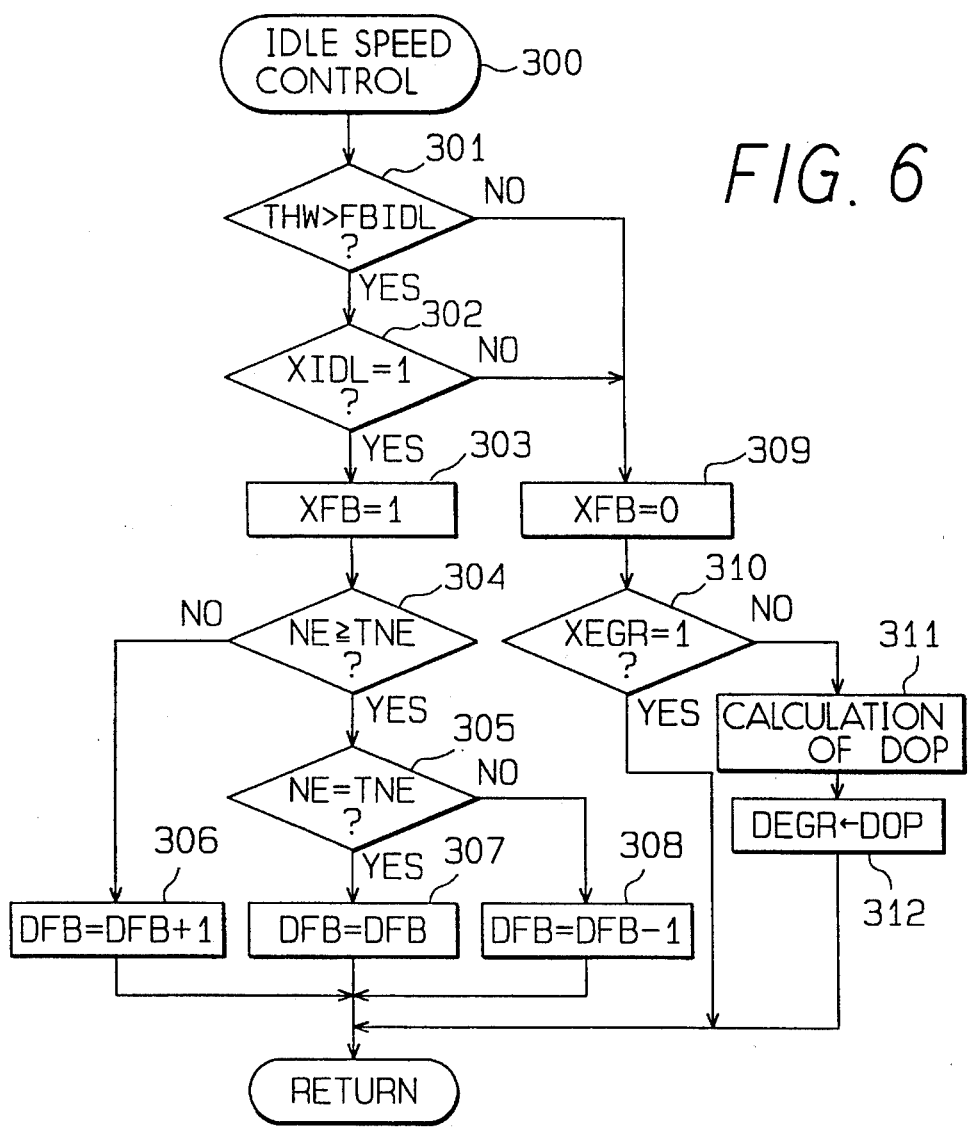
FIG. 6 is a flow chart showing an idle revolution speed control amount calculating routine in the first embodiment.

FIG. 6 is a flow chart showing the routine to calculate the idle revolution speed control amount (step 300 of FIG. 4). In FIG. 6, the CPU 35 performs the determination of the water temperature condition and the idle condition so as to execute the idle revolution speed feedback control at a step 301 and a step 302. The CPU 35 determines whether or not the cooling water temperature THW exceeds the feedback ON water temperature FBIDL (FBIDL=80° C. in this embodiment) at the step 301, and then determines whether or not the idle determination flag XIDL is set to "1".

Then, when both of these determination conditions defined at the steps 301 and 302 can be satisfied, namely when the warming-up operation has been completed and the idle operation is carried out, the CPU 35 advances its process operation to a step 303 at which a feedback ON flag XFB is set to "1". Here, the feedback ON flag XFB corresponds to such a flag used to allow or prohibit the idle revolution speed feedback control. The feedback ON flag XFB=0 indicates "prohibit", whereas the feedback ON flag XFB=1 represents "allow or ON".

Thereafter, the CPU 35 compares the present engine revolution speed NE with the target idle revolution speed TNE which is set in accordance with loads of an air conditioner to calculate a feedback control value DFB by which deviation between these revolution speeds NE and TNE can be reduced.

The CPU 35 determines whether or not NE=NE at a step 304 and determines whether or not NE≧TNE at a step 305.

Then, if NE<TNE, the feedback control value DFB is incremented by "1" in order to increment the engine revolution speed NE by increasing air amount through the bypass path 6. If NE=TNE, then the CPU 35 holds the feedback control value DFB as the present value. Further, if NE>TNE, then the CPU 35 decrements the feedback control value DBF by 1 so as to lower the engine revolution speed NE by decreasing the air amount through the bypass path 6.

On the other hand, when any one of the conditions at the previous steps 301 and 302 is not satisfied, namely during the warming-up operation, or the non-idle operation, the CPU 35 advances this process operation to a step 309 at which the feedback ON flag XFB is cleared to "0". At the next step 310, the CPU 35 determines whether or not the EGR ON flag XEGR is equal to "1". In this case, if XEGR=1, then the CPU 35 directly completes the main routine.

Figure 7:
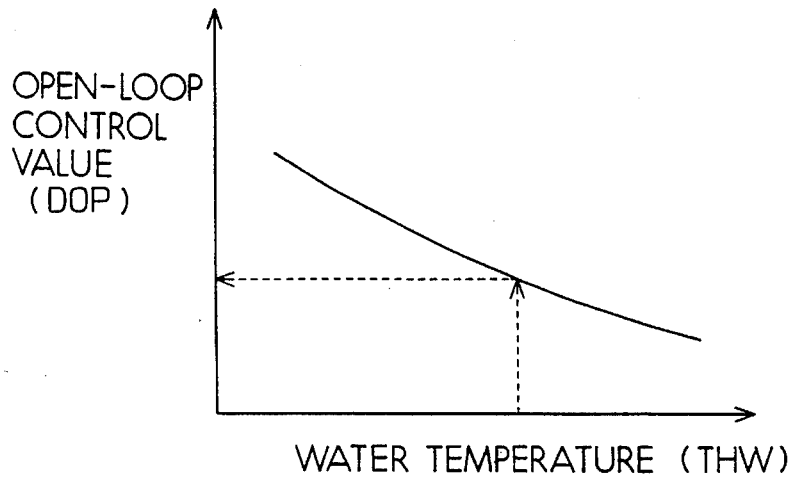
FIG. 7 is a graph showing an open loop control value during the warm-up operation.

When XEGR=0, the CPU 35 advanced its process operation to a step 311 at which the open-loop control value DOP for open-loop control engine revolution speed is calculated. Here, the open-loop control value DOP is calculated in accordance with a water temperature table shown in FIG. 7, for instance. Thereafter, the CPU 35 causes the openloop control value DOP to be stored in the open degree instruction value DEGR at a step 312, and completes this routine.

A flow chart of FIG. 8 shows the valve control amount calculation routine (step 400 of FIG. 4). In FIG. 8, the CPU 35 determines as to whether or not the EGR ON flag XEGR is equal to "1" at a step 401. Then, if XEGR=0, then the CPU 35 directly completes this routine. If XEGR=1, then a calculation is made of the open degree instruction value DEGR so as to obtain the EGR amount in accordance with the engine operation condition at steps 402 to 404.

The CPU 35 reads in the engine revolution speed NE at a step 402, and reads in the air intake pressure PM at a step 403. The CPU 35 calculates the open degree instruction value DEGR=1 in response to the operation region (NE=α1, PM=β1) at this stage with reference to a DEGR data map shown in FIG. 9 and stored in ROM 36. As previously described, in order to properly control the EGR characteristic in response to the specification of the internal combustion engine, the diaphragm back pressure PD of the EGR valve 11 must be corrected, depending upon the engine operation condition. In the open degree instruction value DEGR obtained from the map shown in FIG. 9, such values are given which have been previously determined experimentally in order to correct the diaphragm back pressure PD, depending upon the operation conditions.

FIG. 10 is a flow chart showing the EGR ON/OFF valve drive routine (step 500 of FIG. 4). In FIG. 10, the CPU 35 determines whether or not the EGR ON flag XEGR is equal to 1 at a step 501. Thereafter, the drive instruction value OEGR set in accordance with the flag condition is outputted to the EGR ON/OFF valve 19. That is, when XEGR=1, the CPU 35 outputs OEGR=1 at a step 502 so that the EGR ON/OFF valve 19 is caused to communicate therewith. In this case, the diaphragm back pressure PD is exerted via the EGR ON/OFF valve 19 to EGR valve 11, so that the EGR is performed. When XEGR=0 at a step 503 to release the EGR ON/OFF valve 19 to the atmospheric air. In this case, the EGR valve 11 is fully closed so that no EGR is performed.

Figure 11:
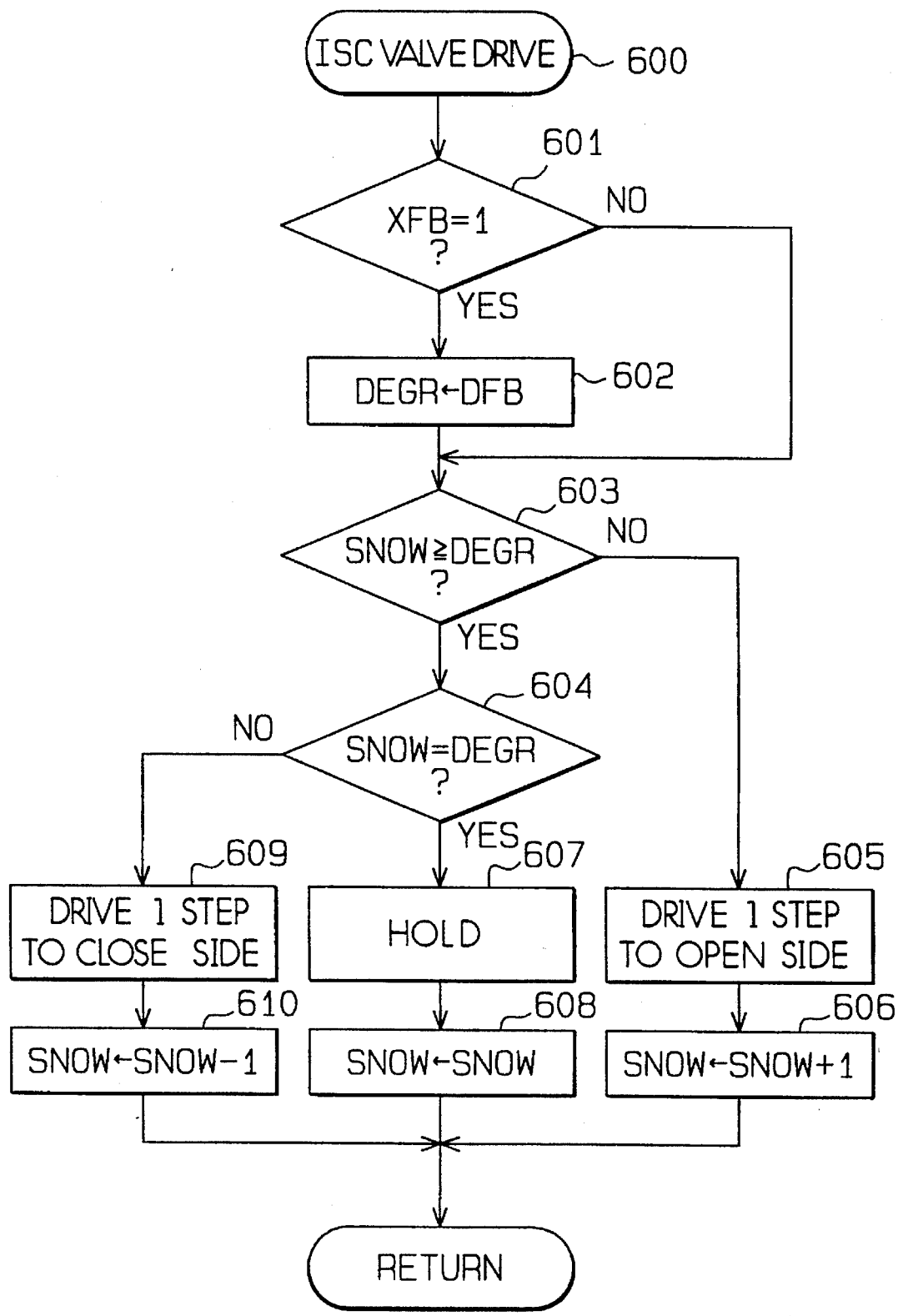
FIG. 11 is a flow chart showing an ISC valve drive routine in the first embodiment.

A flow chart shown in FIG. 11 shows the ISC valve drive routine (step 600 of FIG. 4). In FIG. 11, the CPU 35 determines as to whether or not the feedback ON flag XFB is equal to 1. Then, when XFB=1, the CPU 35 stores the feedback control value DFB to the open degree instruction value DEGR at a step 602, and thereafter advances its process operation to a step 603. At this step 603, if XFB=0, then the process operation is directly advanced to a step 603.

Thereafter, the CPU 35 compares the present actual open degree SNOW of the ISC valve 7 with the open degree instruction value DEGR at steps 603 to 610, and then drives the stepper motor of the ISC valve 7 to either the open side, or the close side in order to reduce deviation between these values.

More specifically, the CPU 35 determines Whether or not it satisfies SNOW EGR at the step 603. At the subsequent step 604, the CPU 35 determines whether or not it satisfies SNOW=DEGR at the step 604. Then, if SNOW<DEGR, then the CPU 35 advances its process operation to a step 605. In this case, the CPU 35 drives the stepper motor to the open side by 1 step at the step 605. At the next step 606, after the actual open degree SNOW is incremented by 1, this routine is ended. Furthermore, if SNOW>DEGR, then the CPU 35 advances its process operation to a step 609. In this case, the CPU 35 drives the stepper motor to the close side by 1 step at the step 609. At the subsequent step 610, the actual open degree SNOW is decremented by 1, and thereafter this routine is completed.

In summary, as previously described, depending upon the operation range of the internal combustion engine, the calculation is made of the control amount of the ISC valve 7 related to any one of the idle revolution speed feedback control, the engine revolution speed open loop control, and the EGR control. In the routine shown in FIG. 11, the ISC valve 7 is properly driven based on this control amount. In other words, when the idle revolution speed feedback control is performed, the ISC valve 7 is driven based on the feedback control value DFB calculated in the routine of FIG. 6, so that the idle revolution speed is controlled to the target idle rotation speed. When the engine revolution speed-open loop control is executed, the ISC valve 7 is driven based on the open-loop control value DOP calculated in the routine of FIG. 6, so that the engine revolution speed is controlled to the target revolution speed during the warming-up operation of the engine.

Also, when the EGR control is executed, the ISC valve 7 is driven based upon the open degree instruction value DEGR calculated in the routine of FIG. 8, so that the diaphragm back pressure PD is controlled in accordance with the engine drive conditions, and further the EGR amount passing through the EGR valve 11 is controlled. At this time, when the ISC valve 7 is driven on the open side, for example, the negative pressure from the negative pressure ports 8 and 9 located near the throttle valve 5 through which the auxiliary air passes via the bypass path 6, becomes low. In connection with this reduction of the negative pressure, the diaphragm back pressure PD is lowered and also the open degree of the EGR valve 11, whereby the EGR amount (EGR ratio) is reduced. In this case, since the open degree instruction value DEGR set by the map shown in FIG. 9 is set so as to achieve the optimum EGR characteristic, the EGR control can be realized in high accuracy by controlling the diaphragm back pressure PD.

As previously described in detail, in accordance with the control apparatus of this embodiment, the negative pressure is introduced from the negative pressure ports 8 and 9 located near the throttle valve 5 is introduced into the EGR valve 11, and the EGR valve 11 opens/closes the EGR path 10 in response to the negative pressure in order to control the EGR amount. Also, the diaphragm back pressure PD introduced into the EGR valve 11 is controlled by the EGR-VM 20 operable in response to the exhaust gas pressure. In addition, as previously explained, in the EGR operation range different from the idle operation range, the control amount of the ISC valve 7 is calculated so as to control the negative pressure given to the negative pressure ports 8 and 9 in addition to the mechanical type EGR control (namely, open degree instruction value DEGR of the routine in FIG. 8), and then the ISC valve 7 is driven based on this control amount (routine of FIG. 11). In this case, the above-described control amount has been calculated by using the predetermined data map (map of FIG. 9) in order to obtain the optimum EGR ratio characteristic in response to the engine operation conditions.

In summary, although the mechanical type EGR control may have a merit in view of cost matters, there is such a problem that the high-precision EGR amount control can be hardly performed, depending upon the drive conditions of the internal combustion engine. In other words, the EGR characteristic under the mechanical type EGR control is set under compromise conditions, since the degree of freedom in design is lowered with respect to the engine drive conditions and a sufficient safety care should be taken. To the contrary, according to the control arrangement of this embodiment, the ISC valve 7 is controlled in open/closed directions during the EGR control, so that a portion of the air taken into the engine may flow through the ISC valve 7, and then the negative pressure at the negative pressure ports 8 and 9 is varied. As a result, the negative pressure (namely, diaphragm back pressure PD) exerted to the EGR valve 11 can be arbitrarily controlled, whereby the EGR control can be realized in high accuracy.

Also, according to the above-described arrangement, since the EGR amount is controlled by using the ISC valve 7 normally used to control the idle revolution speed, the EGR control of this embodiment may be readily applied to the present internal combustion engine. In other words, when the above-described EGR control is employed, only the change in the software specification of ECU 32 is required. As a consequence, the system function can be improved without increasing the cost substantially.

(Second Embodiment)

Figure 12:
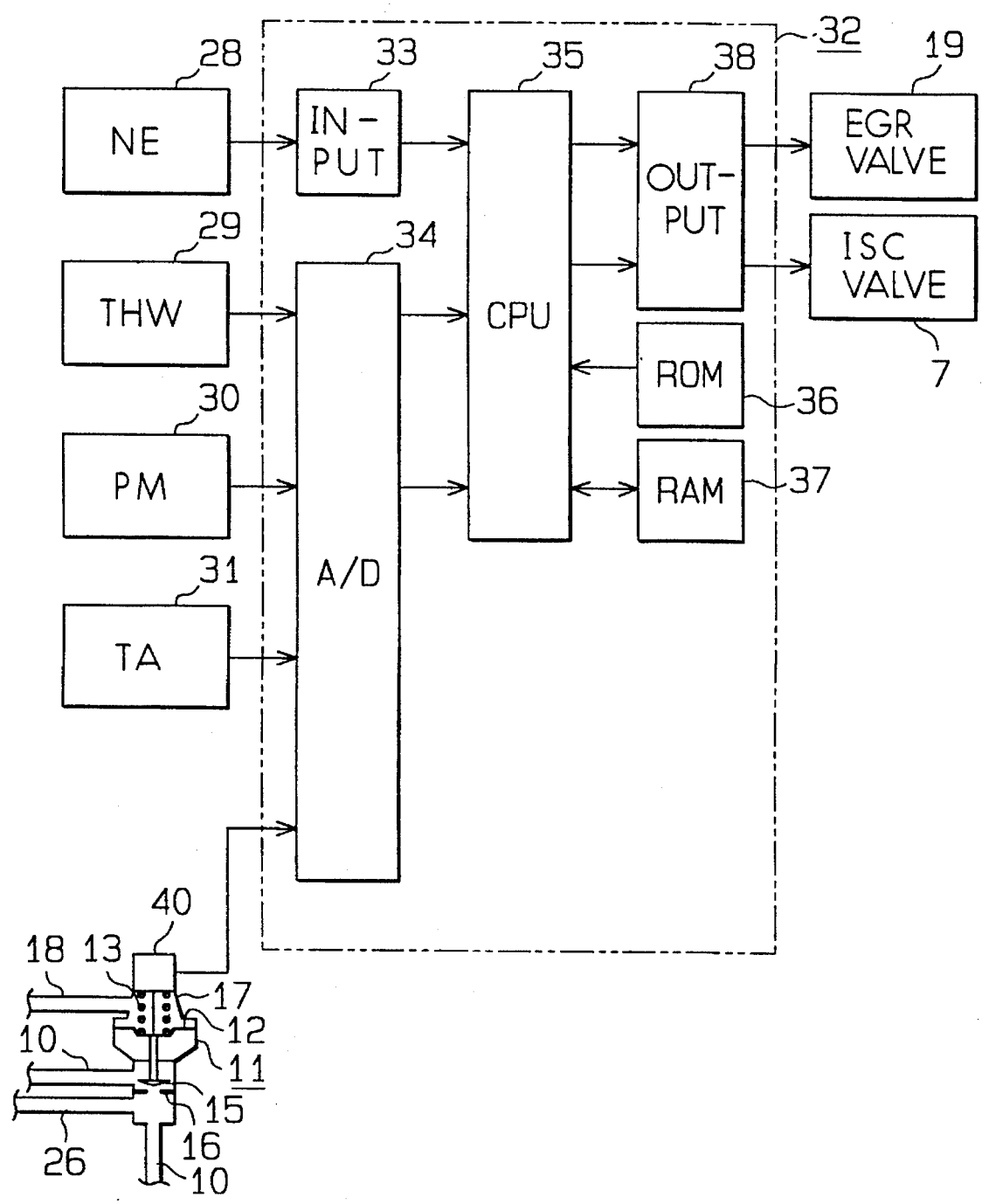
FIG. 12 is a schematic block diagram showing an electronic circuit arrangement of the control apparatus in the second embodiment.

Subsequently, as to a second embodiment, a different point from that of the first embodiment will now be mainly explained. FIG. 12 is a diagram showing an arrangement of a control apparatus according to the second embodiment. That is, in the second embodiment, an EGR valve open degree sensor 40 is provided as open degree sensing means for sensing an open degree of the EGR valve 11. The EGR valve open degree sensor 40 outputs a voltage signal in correspondence with a deviation (shift) amount of the diaphragm, and this voltage signal is applied via the A/D converter 34 into the CPU 35. Then, the CPU 35 calculates the open degree of the EGR valve 11 (actual open degree PEGR of EGR valve) based on the A/D-converted signal.

Figure 13:
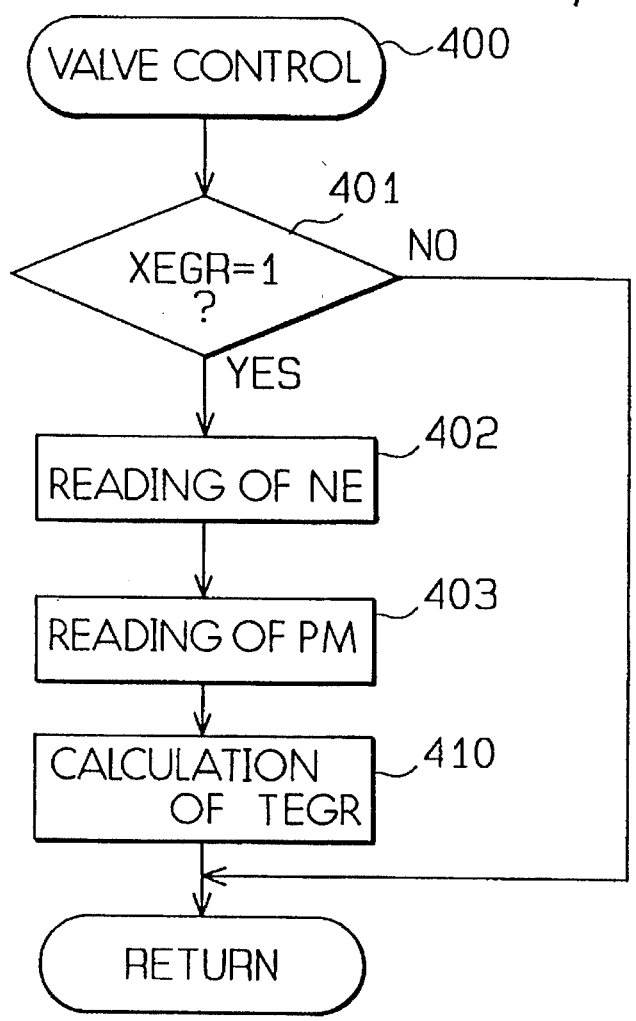
FIG. 13 is a flow chart showing a valve control amount calculating routine in the second embodiment.
Figure 14:
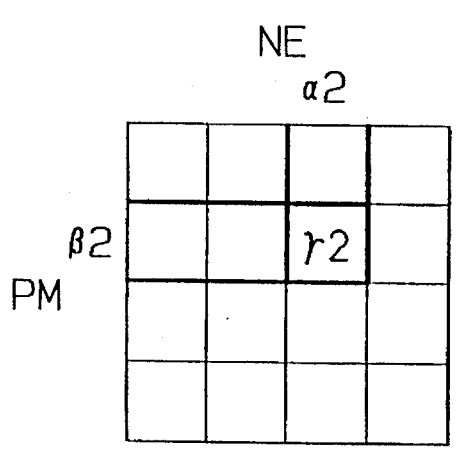
FIG. 14 is a map used to determine a target EGR valve open degree in the second embodiment.

FIG. 13 is a valve control amount calculation routine according to the second embodiment, which corresponds to that of the first embodiment shown in FIG. 8. It should be noted that in FIG. 13, steps 401 to 403 are identical to the process of FIG. 8, and only a step 410 is changed from the step 404 of FIG. 8. Namely, in case that XEGR=1, i.e., the EGR control is allowed, the CPU 35 calculates a target EGR valve open degree TEGR=γ2 in response to the operation region (NE=α2, PM=β2) at this stage by using a data map in FIG. 14. It should be noted that to the target EGR valve open degree TEGR made by the map of FIG. 14, such values which have been previously acquired by the experiment are given so as to correct the diaphragm back pressure PD in response to the engine operation conditions.

Figure 15:
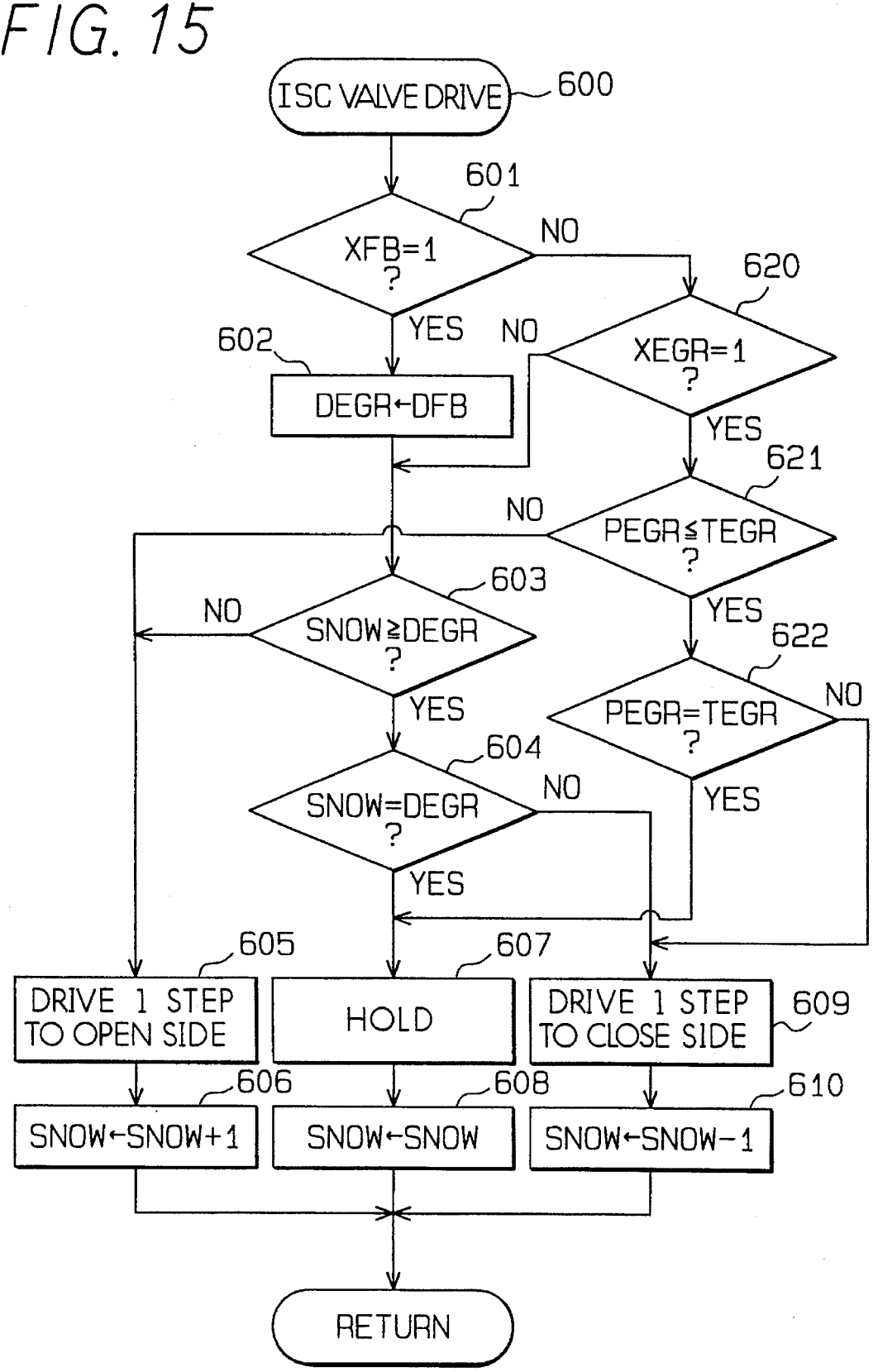
FIG. 15 is a flow chart showing an ISC valve drive routine in the second embodiment.

FIG. 15 shows an ISC valve drive routine according to the second embodiment, which corresponds to that of FIG. 11 according to the first embodiment. It should also be noted that in FIG. 15, steps 601 to 610 are identical to the process of FIG. 11, and thus in the idle revolution speed feedback control range, the CPU 35 drives the ISC valve 7 by using either the feedback control value DFB, or the open-loop control value DOP, which have been calculated in FIG. 6.

Also, in such an operation region different from the above-described feedback control region (namely, operation region of XFB=0), the CPU 35 determines whether or not the EGR ON flag XEGR is equal to 1 at a step 620. If XEGR=1, then the CPU 35 advances its process operation to a step 621. Subsequently, at steps 621, 622 and 605 to 610, the CPU 35 drives the ISC valve 7 in order to reduce deviation between the EGR valve actual open degree PEGR and the target EGR valve open degree TEGR by the routine of FIG. 13.

The CPU 35 determines whether or not PEGR<TEGR at the step 621. At the next step 622, another determination is made as to whether or not PEGR=TEGR. Then, when it is so determined that PEGR>TEGR, the CPU 35 drives the stepper motor by 1 step to the open side of the ISC valve 7 at the step 605. At the subsequent step 606, the actual open degree SNOW of the ISC valve 7 is incremented by 1. In this case, since the negative pressure at the negative pressure ports 8 and 9 become low, the diaphragm back pressure PD is lowered, and the EGR valve actual open degree PEGR is lowered. When PEGR=TEGR, the CPU 35 holds the drive position of the stepper motor and the actual open degree SNOW at the step 607 and 608.

Furthermore, when PEGR=TEGR, the CPU 35 drives the stepper motor by 1 step to the close side at the step 609. At the next step 610, the CPU 35 decrements the actual open degree SNOW by "1". In this case, since the negative pressure at the negative pressure ports 8 and 9 becomes high, the diaphragm back pressure PD is increased and the EGR valve actual open degree PEGR becomes high.

In summary, according to this second embodiment, since such a control operation is carried out that the EGR valve actual open degree PEGR is fed back to the target EGR valve open degree TEGR, the high accuracy EGR control can be realized with the following improved characteristic. Also in this case, the object of the present invention could be achieved in a similar manner to that of the first embodiment.

It should be understood that the present invention may be embodied with the following modes as other preferred embodiments of the above-described respective embodiments.

Figure 16:
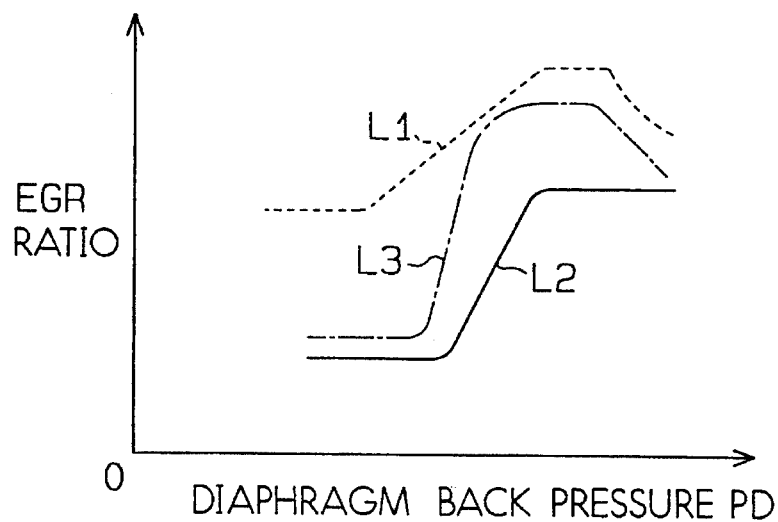
FIG. 16 is a graphic representation showing an EGR characteristic with regard to the negative pressure in other embodiment.
Figure 17:
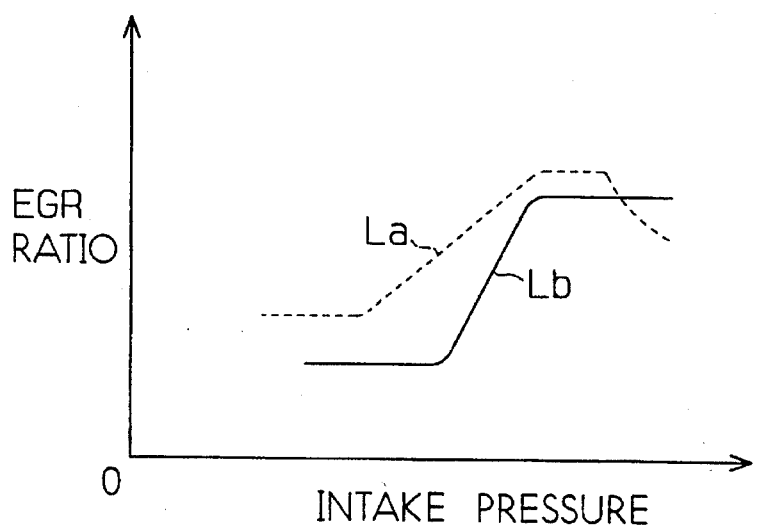
FIG. 17 is a graphic representation showing an EGR characteristic of a conventional mechanical type EGR apparatus.

(1) In the above-mentioned embodiment, the EGR characteristic shown in the characteristic line L2 of FIG. 3 is set as the optimum characteristic so as to achieve an improvement in the exhaust emission. This optimum characteristic may be varied in response to the specification requirement of the internal combustion engine. For instance, when a fuel efficiency is improved, the optimum EGR characteristic becomes another characteristic line L3 of FIG. 16. In this case, similar to the above-explained FIG. 3, the characteristic line L1 is set to be higher than the characteristic L3. It should also be noted that both of a data map corresponding to the characteristic line L2 and another map corresponding to the characteristic line L3 are used, and then the CPU 35 may selectively utilize these maps, depending upon the two modes (exhaust emission mode, and fuel efficiency mode).

(2) Since while the open degree of the ISC valve 7 is selected to be "0" during the EGR control, the mechanical EGR characteristic (characteristic line L1 of FIG. 3) has been set in the above-described embodiment, when the ISC valve 7 is driven from the 0-position to the open side during the EGR control, the ISC valve is only allowed to reduce the EGR amount (EGR ratio). To the contrary, if the ISC valve 7 is held at the neutral position during the EGR control and also the ISC valve 7 may be driven from the neutral position to the open side as well as the close side, then another EGR control is allowable to increase/decrease the EGR amount (EGR ratio). Accordingly, the EGR control may be realized over the wide range. In this case, even when the mechanical EGR characteristics are not previously set by the EGR valve 11 and the EGR-VM 20, this wide range EGR control can be realized.

(3) In the above-explained embodiment, the throttle valve directly driven by the accelerator is utilized. Alternatively, it is possible to arrange the control apparatus with an electronic controlled throttle valve by using a drive motor. In this case, if the auxiliary air amount in the bypass path 6 during the EGR control is reflected to the control amount of the throttle valve, then the air intake amount to the internal combustion engine may be controlled in high accuracy, so that the driveability can be improved.

(4) Although the negative pressure at the first and second negative pressure ports 8 and 9 is introduced to the negative pressure chamber 22 of the EGR-VM 20 in the above-described embodiment, this second negative pressure port 9 may be omitted. In this case, although no negative pressure control is performed by this second negative pressure port 9, this may be compensated by driving the ISC valve 7.

The present invention having been described with reference to presently preferred embodiments may be modified in many other ways without departing from the spirit of the invention.

What is claimed is:

1. A control apparatus for an internal combustion engine with an exhaust gas recirculation, said apparatus comprising:

a recirculation path for recirculating a portion of an exhaust gas of an exhaust path of an internal combustion engine into an air intake path of the internal combustion engine;

an exhaust gas recirculation control valve for receiving a negative pressure from a negative pressure conducting port provided in the air intake path near a throttle valve, and for opening and closing the recirculation path in response to the negative pressure;

a negative pressure control valve for controlling the negative pressure from the negative pressure conducting port to the exhaust gas recirculation control valve in response to a pressure of the exhaust gas from the exhaust gas path;

a bypass path formed in the air intake path for bypassing the throttle valve and the negative pressure conducing port;

an idle revolution speed control valve formed in the bypass path for controlling an amount of auxiliary air to the internal combustion engine during an idle operation of the internal combustion engine;

a three-way valve for releasing and communicating a negative pressure path between the negative pressure conducting port and the exhaust gas recirculation control valve;

first control means for releasing the negative pressure path by using the three-way valve into the air and for driving the idle revolution speed control valve in order to control the idle revolution speed to a desired value during the idle operation of the internal combustion engine; and second control means for communicating the negative pressure path by the three-way valve and for driving the idle revolution speed control valve in order to control the negative pressure at the negative pressure conducting port during an exhaust gas recirculation operation different from the idle operation.

2. A control apparatus as claimed in claim 1, wherein a target recirculation amount of an exhaust gas is preset with respect to engine operation conditions, and wherein the second control means includes:

means for calculating a correction amount used to reduce a deviation amount between the target recirculation amount and an actual exhaust gas recirculation amount of the exhaust gas recirculation control valve, depending on the negative pressure controlled by the negative pressure control valve; and means for driving the idle revolution speed control valve based upon the calculated correction amount.

3. A control apparatus as claimed in claim 1 further comprising:

an open degree detecting means for detecting an actual open degree of the exhaust gas recirculation control valve, and wherein the second control means drives the idle revolution speed control valve so as to reduce a deviation amount between a preset target open degree and the actual open degree of the exhaust gas recirculation control valve detected by the open degree detecting means.

4. A control apparatus for an engine having an exhaust path and an intake path with a throttle valve, said apparatus comprising:

a recirculation path connecting the exhaust path and the intake path for recirculating an exhaust gas from the exhaust path to the intake path;

a recirculation control valve disposed in the recirculation path and controlling flow of the exhaust gas therethrough in response to a negative pressure at around the throttle valve in the intake path;

a bypass path connecting an upstream and a downstream of the throttle valve in the intake path bypassing the throttle valve;

an idle control valve disposed in the bypass path and controlling flow of a bypass air in the bypass path;

first control means controlling, in closed-loop manner, the idle control valve in response to a deviation of an actual engine speed from a target engine speed when the engine is in an idling condition; and second control means controlling the idle control valve in response to engine operating conditions irrespectively of the target engine speed when the engine is in an exhaust gas recirculation condition different from the engine idle condition.

5. A control apparatus as claimed in claim 4, further comprising:

a first path connected to the intake path at around the throttle valve and to the recirculation control valve;

a second path connected to the intake path at an upstream of the throttle valve; and a modulation valve disposed in the first path and connected to the second path and to the recirculation path, the modulation valve modulating the intake pressure in the first path by a pressure in the second path in response to an exhaust gas pressure in the recirculation path.

6. A control apparatus as claimed in claim 5, wherein the second path opens at a downstream of an upstream opening of the bypass path to the intake path.

7. A control apparatus as claimed in claim 4, wherein the second control means controls the idle control valve in accordance with a pressure in the intake path and the engine speed during the exhaust recirculation.